United States Patent [19]

Kinney et al.

[11] Patent Number: 4,852,079
[45] Date of Patent: Jul. 25, 1989

[54] OPTICAL SPECTRUM ANALYZER

[75] Inventors: Terrance R. Kinney, South Bend; Stephen M. Emo, Elkhart; Richard N. Poorman, South Bend, all of Ind.

[73] Assignee: Allied-Signal Inc., Morristown, N.J.

[21] Appl. No.: 124,535

[22] Filed: Nov. 23, 1987

[51] Int. Cl.$^4$ .............................................. H04B 9/00
[52] U.S. Cl. ..................................... 370/3; 350/96.18; 455/600; 455/612
[58] Field of Search ............... 455/600, 606, 607, 608, 455/612, 617, 619; 370/1, 3; 350/96.15, 96.17, 96.18, 96.19, 96.2, 503

[56] References Cited

U.S. PATENT DOCUMENTS

| | | | |
|---|---|---|---|
| 3,845,294 | 10/1974 | Indig et al. | 370/3 |
| 3,920,983 | 11/1975 | Schlafer et al. | 370/3 |
| 3,953,727 | 4/1976 | d'Auria et al. | 370/3 |
| 4,299,488 | 11/1981 | Tomlinson | 455/612 |
| 4,626,066 | 12/1986 | Levinson | 370/3 |
| 4,715,027 | 12/1987 | Mahapatra | 370/3 |
| 4,723,829 | 2/1988 | Koonen | 350/96.19 |
| 4,740,951 | 4/1988 | Lizet et al. | 370/3 |

OTHER PUBLICATIONS

Metcalf, "High Capacity Wavelength Multiplexer with a Large Diameter GRIN Rod Lens", Applied Optics, vol. 21, #5, 3-1-82, pp. 794-796.

*Primary Examiner*—Robert L. Griffin
*Assistant Examiner*—Leslie Van Beek
*Attorney, Agent, or Firm*—Leo H. McCormick, Jr.; Ken C. Decker

[57] ABSTRACT

An optical spectral analyzer (10) for receiving an input beam (30) through a multi-mode optic fiber (28). The input or beam (30) has a predetermined spectral band width. The random individual spectral components of the beam (30) are dispersed by a grating (40) to generate a spectrum (42, 42' ... 42$^N$). A detector (52) senses the magnitude of the elements in a reflected focused spectrum (50, 50' ... 50$^N$) to recover the information placed on the optic fiber (28) at a remote location by a spectrum encoding device.

17 Claims, 1 Drawing Sheet

MONOLITHIC SPECTRUM ANALYZER PLANAR OPTIC PROCESSING WAVEGUIDE

BACKGROUND OF THE INVENTION

The present invention relates to a device for receiving data and in particular to an opto-electric device which analyzes a random spectral content of a light band. The received spectrum of radiant energy is manipulated (demultiplexed) to determine its individual spectral components. The spectral components are focused onto a multiplicity of individual opto-electric conversion devices which subsequently contain the electric data which emulates from the optic spectrum.

Many applications require the transmission of data between remote points. The most common methods of transmitting data are electrical conductors and by means of modulated radio frequency signals. Both of these methods of transmitting data are subject to electro-magnetic noise, radiation, lightning and other induced electrical effects. To overcome these problems, there has occurred substantial development of optical transmission media, such optical methods typically incorporating modulated laser beams and optic fibers.

It is further common to multiplex signals transmitted by means of a single transmitting medium. Typically, such multiplexing is accomplished utilizing well known sampling techniques wherein a multiplicity of signals are imposed on a single carrier and subsequently separated and demodulated at an intelligence receiving device. This type of signal multiplexing requires the use of sophisticated electronic equipment at both the transmitting and receiving stations. Noise and other interference problems may be aggravated in a multiplexed data transmission line.

When the data being transmitted is in the form of binary coded signals, serial multiplexing of the signals reduces the speed at which information can be transmitted from one point to another. Parallel transmission of binary signals can reduce this time factor but requires an attendant increase in the number of conductors or other data transmission media.

Lastly, there are many applications of electronic devices in which data is sensed at a remote point and in a very hostile environment. For example, a gas turbine engine utilizing an electronic engine control requires the sensing of various turbine parameters such as temperature, mass air flow, speed and the like and the transmission of the sensed data to a remotely located electronic engine control. The sensors must be located on or adjacent to the gas turbine. The sensors and associated data transmitting devices must be capable of reliable operation in the hostile temperature while being subjected to, vibration and pressure environment of the engine. EMI, EMP and other induced electrical noise can seriously degrade system performance.

There therefore exists a need to provide a device that is capable of receiving large quantities of data from one point to another at high speed and with minimum susceptibility to environmental effects. It is further desirable that this mechanism be of small size, highly resistant to hostile environments, and capable of manufacture at reasonable cost.

Broadly, the present invention is an optical spectrum data demodulation device which receives a source of light with random spectral components having a the predetermined spectral band width; means for dispersing the beam as a function of the wave length to generate a light spectrum; detector means for sensing any portion or portions of a continuous spectrum; and a processing means for generating digital data from the optical spectra. The beam of radiant energy comprising individually modulated spectral elements is transmitted via a fiber optic conductor.

It is therefore an object of the invention to provide an improved data receiving device.

It is a further object of this invention to provide a data receiving device with a multi-mode fiber medium for receiving modulated signals.

Another object of the invention is to provide such a device which utilizes a geodesic lens to collimate an input light beam and prevent the dispersion of the multi-mode input signal.

Still another object of the invention is to provide a device which utilizes a grating member formed vertically in a plane perpendicular to a horizontal plane of an guide where the grating disperses a collimated beam from an input source into continuous spectrum.

Yet another object of the invention is to use a curved reflector to focus each individual color from the spectrum uniformly to a unique point on a detector array.

BRIEF DESCRIPTION OF THE DRAWINGS

These and other objects and purposes of the invention and the invention itself will be best understood in view of the following detailed description thereof taken in conjunction with the appended drawings wherein.

DESCRIPTION OF THE PREFERRED EMBODIMENTS

Figure 1:
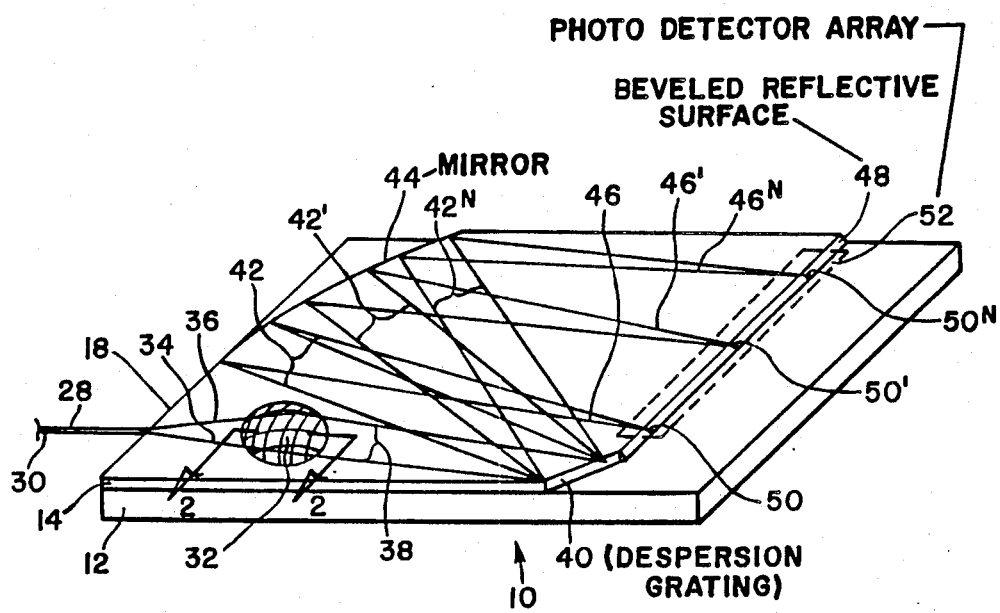
FIG. 1 is a perspective drawing of a device in accordance with the invention; and, FIG. 2 is a section view of a geodesic lens taken along line 22 for collimating light in a spectral analyzer.
Figure 2:
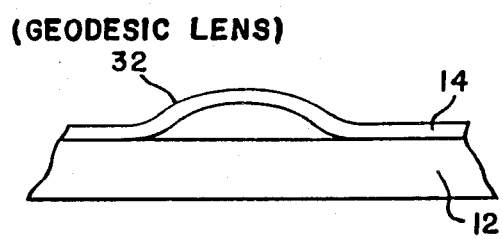

Referring first to FIG. 1, there is shown an optical spectrum data decoding device 10 made according to the principles of this invention. Device 10 has a rectangular silicon substrate 12 to which is bonded a glass wave guide 14. A multi-mode random optical fiber conductor 28 is welded securely to the edge 18 of the glass guide 14. An input beam 30 of light is transmitted through the optical fiber 28 and enters the wave guide 14. The input beam 30 diverges as indicated by lines 34 and 36 and impinges on lens 32. Lens 32 in the illustrated embodiment is a geodesic lens as shown in FIG. 2. Lens 32 collimates the beam 30 to form beam 38 which is then incident on a dispersion grating 40. The grating 40 disperses the beam 38 as a function of the frequency of the constituents of the beam 38. The dispersed beam is, accordingly, comprised of a multiplicity of collimated monochromatic beams $42, 42'\ldots 42^N$ traveling at different angles or simply a spectrum. Beams $42, 42'\ldots 42^N$ impinge upon a curved metalized surface 44 (mirror) which focuses the collimated beams $42, 42'\ldots 42^N$ into a series of monochromatic light cones $46, 46'\ldots 46^N$, each converging toward a unique point. Light cones $46, 46'\ldots 46^N$ are directed downward out of the light guide 14 by a beveled reflective surface 48. Light cones $46, 46'\ldots 46^N$ continue to converge where they each come to a focus in a plane parallel to and below guide 14, forming a continuous line of juxtaposed monochromatic points $50, 50'\ldots 50^N$. Formed in the above said plane, of the silicon substrate 12 are a multiplicity of photo detectors arranged in a linear array 52 such that individual ones of the detectors intercept a small continuous band of the elements of the spectrum.

The photo detector array may utilize from 128 to 4096 individual photo detectors allowing the spectral line to be divided into less than 1 percent to 0.025 percent increments of the total spectral width. The grating is chosen to yield a wide dispersion of the first order and to prevent overlap of the other orders while simultaneously allowing the longest wavelength to be viewed. If, for example, a 900 to 450 nanometer wave length range is chosen, a 555 nanometer grating spacing allows the spectrum to be widely dispersed, the dispersion angle being determined by the formula:

$$\frac{m\lambda}{d} = \sin\alpha + \sin\beta$$

where:
  d=grating spacing $\lambda$=wave length $\alpha$=incident angle $\beta$=dispersed angle This grating spacing further eliminates the possibility of second order overlap.

The resolution of the grating is chosen to be on the order of 2 to 5 times the resolution of the array. Therefore for an array of 1024 detectors and an overall band width of 450 nanometers, the resolution or selectivity of the system is less than 0.5 nanometers. A grating of 4,500 radiators yields a 0.2 nanometer optical resolving power at $\lambda$=900 nanometers. This requires that the collimated beam be at least 2.54 millimeter wide and thus the focal length of the first collimator lens be at least 6.25 millimeters. This is based on a given dispersion angle from the fiber of 20 degrees with the lens having its focal point at the end of the fiber. In this particular case, the grating dipersing angle is approximately 46 degrees.

Finally electrical signal processing of detector signals is done by signal processing electronics of a type such as disclosed in U.S. patent application No. 161,533 filed of Feb. 29, 1988 located in substrate 12.

From the above description it will now be seen that the present invention provides a uniquely versatile device which enables the decoding and analysis of data from a remote point utilizing a multi-mode optical fiber conductor and an ordinary light source. The device is capable of handling substantial quantities of data due to its ability to separate a beam of ordinary light into a spectrum comprising large numbers of spectral elements. The recombined spectrum provides parallel transmission of the data and this is done without the need for complex and expensive multiplexing circuitry. Because all connections between the source, modulating means, and analyzer are provided by means of optical fiber conductors, the device is highly resistant to EMI, EMP, and other induced electrical effects. The optical elements themselves can be fabricated from materials having exceptionally high physical and environmental tolerance whereby the system is uniquely suited for use in hostile environments such as electronic engine controls.

Although the present invention has been illustrated and described in connection with an example embodiment, it will be understood that this is illustrative of the invention, and is by no means restrictive, thereof. It is reasonable to be expected that those skilled in the art can make numerous revisions and additions to the invention and it is intended that such revisions and additions will be included in the scope of the following claims as equivalents of the invention.

What we claim is:

1. An optical spectral real time analyzer comprising:
   multimode means for receiving an input beam of light from a source though a fiber optic conductor, said input beam having random spectral elements within a predetermined bandwidth;
   a geodesic collimating lens for receiving said beam of light from said fiber optic conductor to form a collimated beam;
   single multimode means for dispersing said input beam as a function of wavelength to generate a spectrum, said spectrum having a continuous band of juxaposed spectrum elements;
   a single reflector for focusing said spectrum;
   multiple detector means having a plurality of light detectors, each individual detector of said plurality of light detectors being positioned to receive a predetermined portion of said continuous band of the elements in said spectrum to sense the magnitude of each of the elements in said spectrum;
   a multimode optical guide having a layer of glass with a thickness greater than 100 $\mu$m for directing said input beam of light onto said multiple detector means; and
   electronic means for processing said spectrum to generate digital data from said input beam of light.

2. The analyzer of claim 1 wherein said dispersing means includes a diffraction grating formed in a plane perpendicular to said guide optically disposed to receive said collimated beam.

3. The analyzer of claim 2 further including a curved mirror optically disposed to focus said spectrum into a continuous band of juxtaposed monochromatic spectral elements.

4. The analyzer of claim 3 wherein said optic fiber conductor is welded to an edge of said guide.

5. The analyzer of claim 4 further including a second reflecting surface formed at the focal plane of the first reflecting surface directing the light onto a detector array and disposed to reflect said spectrum towards said detectors.

6. The analyzer of claim 5 wherein said light detectors are semiconductor photo detectors formed in a substrate layer.

7. An optical spectral real time analyzer comprising:
   multimode means for receiving an input beam of light from a source, said beam having random spectral elements within a predetermined bandwidth;
   a single lens for collimating said input beam of light;
   single multimode means for dispersing said input beam as a function of wavelength to generate a spectrum, said spectrum having a continuous band of elements;
   a single reflector for focusing said spectrum;
   multiple detector means for sensing the magnitude of each of the elements in said spectrum;
   a multimode optical guide having a layer of glass with a thickness greater than 100 $\mu$m for directing said input beam of light onto said multiple detector means; and
   electronic means for processing said spectrum to generate digital data from from said input beam of light.

8. The analyzer as recited in claim 7 wherein said multiple detector means includes;
   a plurality of light detectors, each individual detector of said plurality of light detectors being positioned to receive a predetermined portion of said continuous band of the elements in said spectrum.

9. The analyzer as recited in claim 8 wherein said single multimode means disperses said input beam of light into a continuous band of juxtaposed spectral elements.

10. The analyzer as recited in claim 9 wherein said single lens is a a multimode fiber optic conductor through which said input beam of light is carried from said source to said analyzer.

11. The analyzer as recited in claim 10 wherein said single lens is:
a geodesic collimating lens which receives said beam of light from said fiber optic conductor to form a collimated beam.

12. The analyzer as recited in claim 11 wherein said single multimode means includes;
a diffraction grating formed in a plane perpendicular to said optical processing guide for receiving said collimated beam from said geodesic collimating lens.

13. The analyzer as recited in claim 12 further including:
a single curved reflective surface located perpendicular to said optical processing guide to focus each of the individual spectral elements of the input beam into a continuous band of juxtaposed monochromatic spectral elements.

14. The analyzer as recited in claim 13 wherein said fiber optic connector is fixed to the edge of the layer of glass at the focal point of the geodesic collimating lens.

15. The analyzer as recited in claim 14 further including:
a flat reflective surface located at the focal plane of said curved reflective surface to reflect said continuous band of juxtaposed monochromatic spectral elements onto said plurality of light detectors.

16. The analyzer as recited in claim 15 wherein said plurality of light detectors is an array of semiconductor photodetectors formed in said substrate processing means.

17. The analyzer as recited in claim 16 said substrate processing means includes:
electronic means for transforming an optical input spectrum into a digital format representing the magnitude of each element in the input.

* * * * *